(12) United States Patent
Zheng et al.

(10) Patent No.: US 9,587,501 B2
(45) Date of Patent: Mar. 7, 2017

(54) ROTARY MACHINE SECONDARY SEALING ASSEMBLY AND METHOD OF ASSEMBLING THE SAME

(71) Applicant: General Electric Company, Schenectady, NY (US)

(72) Inventors: Xiaoqing Zheng, Niskayuna, NY (US); Rahul Anil Bidkar, Niskayuna, NY (US); Karimulla Shaik Sha, Anantapur (IN); Azam Mihir Thatte, Rotterdam, NY (US)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 14/076,946

(22) Filed: Nov. 11, 2013

(65) Prior Publication Data

US 2015/0130142 A1    May 14, 2015

(51) Int. Cl.
| | | |
|---|---|---|
| *F01D 11/00* | (2006.01) |
| *F16J 15/34* | (2006.01) |
| *F16J 15/38* | (2006.01) |
| *F16J 15/00* | (2006.01) |
| *F16J 15/44* | (2006.01) |

(52) U.S. Cl.
CPC ............ *F01D 11/003* (2013.01); *F16J 15/34* (2013.01); *F16J 15/3464* (2013.01); *F16J 15/38* (2013.01); *F01D 11/005* (2013.01); *F16J 15/002* (2013.01); *F16J 15/441* (2013.01); *Y10T 29/49863* (2015.01)

(58) Field of Classification Search
CPC ........ F16J 15/002; F16J 15/3288; F16J 15/34; F16J 15/3464; F16J 15/3484; F16J 15/38; F16J 15/44; F16J 15/441; F16J 15/4472; F16J 15/54; F01D 11/02; F01D 11/003; F01D 11/005; F01D 11/025
See application file for complete search history.

(56) References Cited

U.S. PATENT DOCUMENTS 2,365,046 A * 12/1944 Bottomley ............... F16J 15/38
277/394
3,101,200 A * 8/1963 Tracy ................... F16J 15/3488
277/399

(Continued)

FOREIGN PATENT DOCUMENTS

EP    0 343 300 A2    11/1989
EP    0 343 300 A3    11/1989

(Continued)

*Primary Examiner* — Nicholas L Foster
(74) *Attorney, Agent, or Firm* — Armstrong Teasdale LLP (57) ABSTRACT

A seal ring assembly for use with a rotary machine that includes an axis of rotation includes a seal housing comprising a secondary sealing surface and a secondary seal assembly coupled to the seal housing. The secondary seal assembly includes a seal ring coupled to the seal housing, wherein the seal ring is configured to form a secondary seal with the secondary sealing surface. The secondary seal assembly also includes at least one protection ring positioned upstream from the seal ring. The secondary seal assembly is configured to be biased along the axis such that biasing the at least one protection ring facilitates removing debris from at least a portion of the secondary sealing surface over which the seal ring travels during biasing.

18 Claims, 4 Drawing Sheets

(56) References Cited

U.S. PATENT DOCUMENTS

| | | | | |
|---|---|---|---|---|
| 3,184,244 A * | 5/1965 | Van Vleet | ............... | F16J 15/38 277/397 |
| 3,239,232 A * | 3/1966 | Andresen | ............... | F16J 15/38 277/397 |
| 3,675,935 A * | 7/1972 | Ludwig | ............... | F16J 15/342 277/400 |
| 3,811,687 A * | 5/1974 | Honold | ............... | F16J 15/346 277/361 |
| 4,183,540 A * | 1/1980 | Hytonen | ............... | F16J 15/40 277/368 |
| 4,586,719 A * | 5/1986 | Marsi | ............... | F04D 29/126 277/361 |
| 4,962,691 A | 10/1990 | Kanao | | |
| 5,137,284 A * | 8/1992 | Holder | ............... | F16J 15/3416 277/390 |
| 5,172,918 A * | 12/1992 | Pecht | ............... | F16J 15/002 277/400 |
| 5,174,584 A * | 12/1992 | Lahrman | ............... | F16J 15/3412 277/400 |
| 5,997,004 A * | 12/1999 | Braun | ............... | F16J 15/3288 277/352 |
| 6,311,983 B1 * | 11/2001 | Burcham | ............... | F16J 15/002 277/370 |
| 7,318,404 B1 | 1/2008 | Chu | | |
| 7,758,051 B2 * | 7/2010 | Roberts-Haritonov | ............... | F16J 15/342 277/400 |
| 7,779,627 B1 | 8/2010 | Ries | | |
| 7,934,892 B2 | 5/2011 | Fritsche et al. | | |
| 8,141,476 B2 | 3/2012 | Liour | | |
| 2002/0079648 A1 * | 6/2002 | Uth | ............... | F16J 15/342 277/401 |
| 2003/0030220 A1 * | 2/2003 | Datta | ............... | F01D 11/08 277/355 |
| 2006/0145426 A1 * | 7/2006 | Schroeder | ............... | F16J 15/324 277/559 |
| 2007/0108704 A1 * | 5/2007 | Craig | ............... | F01D 11/003 277/370 |
| 2007/0262532 A1 * | 11/2007 | Ohama | ............... | F16J 15/3404 277/390 |
| 2008/0018054 A1 * | 1/2008 | Herron | ............... | F01D 11/02 277/409 |
| 2008/0022961 A1 | 1/2008 | Chu | | |
| 2008/0098884 A1 | 5/2008 | Varanasi et al. | | |
| 2008/0145160 A1 | 6/2008 | Fritsche et al. | | |
| 2008/0202483 A1 | 8/2008 | Procknow | | |
| 2008/0256794 A1 | 10/2008 | Maier | | |
| 2009/0174150 A1 | 7/2009 | Smith et al. | | |
| 2009/0289421 A1 | 11/2009 | Liour | | |
| 2010/0017555 A1 | 1/2010 | Chang et al. | | |
| 2010/0192764 A1 | 8/2010 | Ries | | |
| 2010/0213674 A1 * | 8/2010 | Garrison | ............... | F01D 11/001 277/405 |
| 2012/0058000 A1 * | 3/2012 | Rogers | ............... | F04B 9/02 417/437 |
| 2012/0251290 A1 * | 10/2012 | Turnquist | ............... | F01D 11/001 415/1 |

FOREIGN PATENT DOCUMENTS

| | | |
|---|---|---|
| EP | 1 887 252 A1 | 2/2008 |
| EP | 2 206 937 A1 | 7/2010 |
| WO | 2009088741 A1 | 7/2009 |
| WO | 2010090684 A2 | 8/2010 |

* cited by examiner

ROTARY MACHINE SECONDARY SEALING ASSEMBLY AND METHOD OF ASSEMBLING THE SAME

BACKGROUND OF THE INVENTION

This application relates generally to rotary machines and more particularly, to a secondary sealing assembly for sealing a rotary machine.

At least some rotary machines, such as steam turbine engines, have multiple defined fluid flow paths extending therethrough. A primary flow path includes, in a serial-flow relationship, a fluid inlet, a turbine, and a fluid outlet. A leakage flow path exists in some known rotary machines upstream of the primary flow path. In at least some known rotary machines, the fluid contains particulate debris and leaks into the leakage flow path, thus decreasing the efficiency of the machine and introducing harmful contaminants into the machine. The fluid must be closely monitored and controlled to eliminate the debris that may deposit on internal components of the rotary machine and cause blockage of at least a portion of the flow paths.

Some rotary machines use a plurality of sealing assemblies in the leakage flow path to facilitate increasing the operating efficiency of the rotary machine. Generally, known rotary machines include a primary seal and a secondary seal in the leakage flow path. The primary seal is coupled between a stationary component and a rotary component to provide sealing between a high-pressure area and a low-pressure area. The secondary seal is positioned within the stationary component and is axially movable to facilitate operation of the primary seal. During operation of the rotary machine, a portion of the debris contained in the leakage flow is deposited near the secondary seal and builds up on the stationary components of the rotary machine. This accumulation of debris prevents the axial movement of the secondary seal, which may lead to failure of the primary seal. Failure of the primary seal may decrease the operating efficiency of the rotary machine.

In some known rotary machines, such as gas turbine engines, maintenance of the leakage sealing assemblies may be relatively straightforward. At least some known leakage sealing assemblies in gas turbines engines may be easily disassembled from the rotating shaft and cleaned of any debris buildup. However, is some known rotary machines, such as steam turbine engines, maintenance of the secondary seal may be challenging. At least some known steam turbine engines may be operated continuously for a period of years, thus facilitating excessive buildup of debris and contaminants on the stationary component near the secondary seal. In addition, at least some known steam turbine engines are extremely large, containing rotatable shafts with diameters larger than 20 inches. Such large internal components add to the complexity of maintenance of the seals of such known steam turbine engines.

BRIEF DESCRIPTION OF THE INVENTION

In one aspect, a seal ring assembly for use with a rotary machine that includes an axis of rotation is provided. The seal ring assembly includes a seal housing comprising a secondary sealing surface and a secondary seal assembly coupled to the seal housing. The secondary seal assembly includes a seal ring coupled to the seal housing, wherein the seal ring is configured to form a secondary seal with the secondary sealing surface. The secondary seal assembly also includes at least one protection ring positioned upstream from the seal ring. The secondary seal assembly is configured to be biased along the axis such that biasing the at least one protection ring facilitates removing debris from at least a portion of the secondary sealing surface over which the seal ring travels during biasing.

In another aspect, a face seal assembly for use with a rotary machine that includes an axis of rotation is provided. The face seal assembly includes a rotating seal ring, a seal housing including a secondary sealing surface, and a stationary seal ring assembly coupled between the seal housing and the rotating seal ring such that the rotating seal ring and the stationary seal ring assembly form a primary seal. The stationary seal ring assembly includes a secondary seal assembly that includes a secondary seal ring coupled to the seal housing, wherein the secondary seal ring is configured to form a secondary seal with the secondary sealing surface. The secondary seal assembly also includes at least one protection ring positioned upstream from the seal ring. The secondary seal assembly is configured to be biased along the axis such that biasing the at least one protection ring facilitates removing debris from at least a portion of the secondary sealing surface over which the seal ring travels during biasing.

In yet another aspect, a method of assembling a seal ring assembly for use with a rotary machine having an axis of rotation is provided. The method includes providing a seal housing that includes a secondary sealing surface and coupling a secondary seal assembly to the seal housing proximate the secondary sealing surface, wherein the secondary seal assembly includes a seal ring and at least one protection ring. The seal ring is coupled to the seal housing such that the seal ring and the secondary seal surface form a secondary seal. The at least one protection ring is coupled upstream from the seal ring, wherein the secondary seal assembly is configured to be biased along the axis such that biasing the at least one protection ring facilitates removing debris from at least a portion of the secondary sealing surface over which the seal ring travels during biasing.

DETAILED DESCRIPTION OF THE INVENTION

The exemplary assemblies and methods described herein overcome at least some of the disadvantages associated with rotary machines that may operate with fluid leakage from the rotary machine to the external environment. The embodiments described herein provide a secondary sealing assembly positioned in a stationary component of the rotary machine that facilitates improving rotary machine performance. More specifically, the secondary sealing assembly described herein is a self-cleaning sealing assembly that includes at least one sealing ring that substantially reduces fluid leakage from a rotary machine and at least one protection ring positioned on the high pressure side of the sealing ring that continuously removes foreign material, such as debris and contaminants, deposited in the stationary component by the process fluid, such as steam used in a steam turbine engine.

Figure 1:
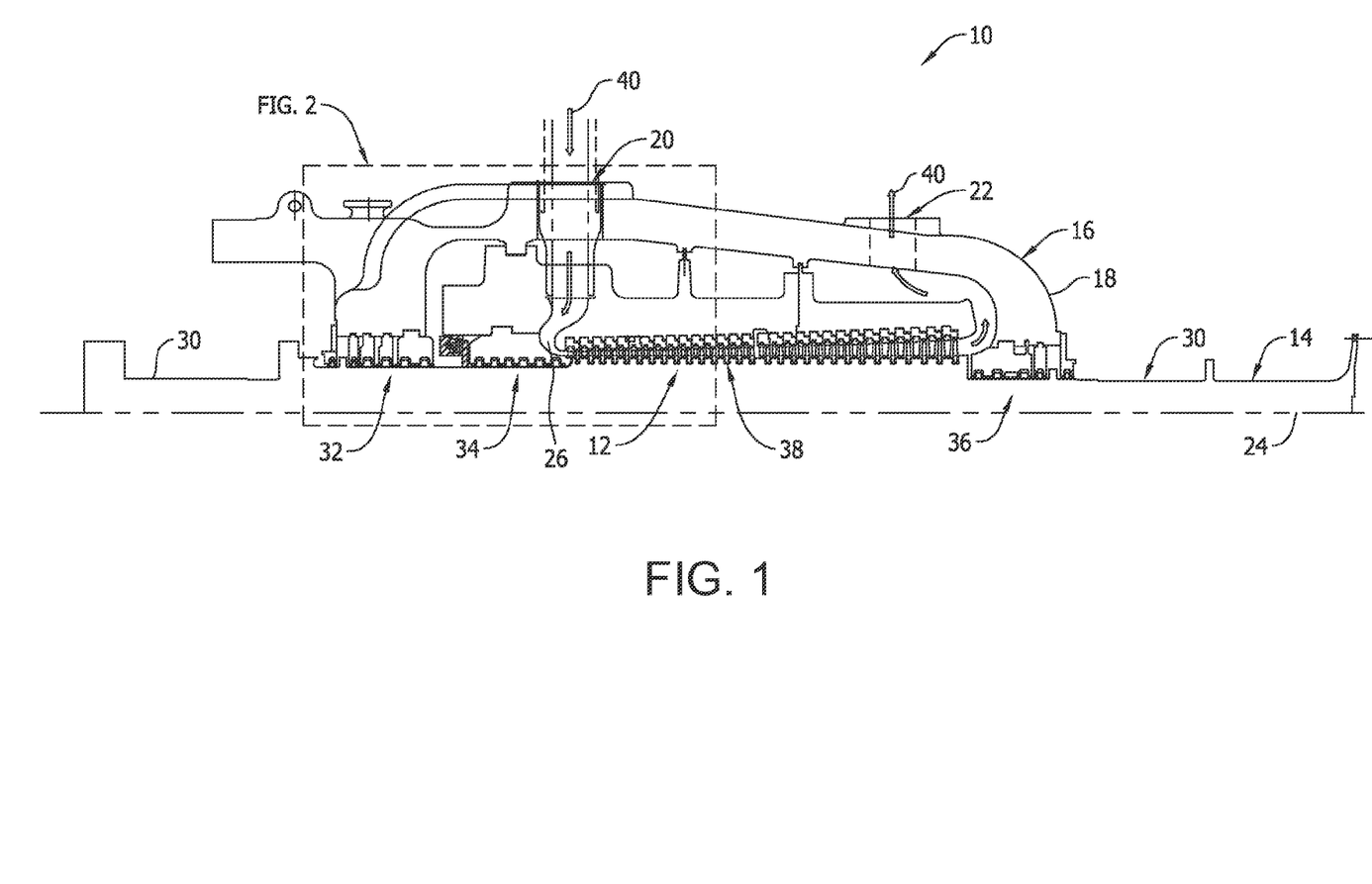
FIG. 1 is a schematic view of an exemplary steam turbine engine.

FIG. 1 is a schematic view of an exemplary steam turbine engine 10. While FIG. 1 describes an exemplary steam turbine engine, it should be noted that the sealing apparatus and systems described herein is not limited to any one particular type of turbine engine. One of ordinary skill in the art will appreciate that the current sealing apparatus and systems described herein may be used with any rotary machine, including a gas turbine engine, in any suitable configuration that enables such an apparatus and system to operate as further described herein.

In the exemplary embodiment, steam turbine engine 10 is a single-flow steam turbine engine. Alternatively, steam turbine engine 10 may be any type of steam turbine, such as, without limitation, a low-pressure turbine, an opposed-flow, high-pressure and intermediate-pressure steam turbine combination, a double-flow steam turbine engine, and/or the like. Moreover, as discussed above, the present invention is not limited to only being used in steam turbine engines and can be used in other turbine systems, such as gas turbine engines.

In the exemplary embodiment, steam turbine engine 10 includes a plurality of turbine stages 12 that are coupled to a rotatable shaft 14. A casing 16 is divided horizontally into an upper half section 18 and a lower half section (not shown). Steam turbine engine 10 includes a high pressure (HP) steam inlet conduit 20 and a low pressure (LP) steam exhaust conduit 22. Shaft 14 extends through casing 16 along a centerline axis 24. Shaft 14 is supported at opposite end portions 30 of shaft 14 by journal bearings (not shown). A plurality of end packing regions or sealing members 32, 34, and 36 are coupled between rotatable shaft end portions 30 and casing 16 to facilitate sealing casing 16 about shaft 14.

During operation, high pressure and high temperature steam 40 is channeled to turbine stages 12 from a steam source, such as a boiler or the like (not shown), wherein thermal energy is converted to mechanical rotational energy by turbine stages 12. More specifically, steam 40 is channeled through casing 16 via steam inlet conduit 20 into an inlet bowl 26 where it impacts a plurality of turbine blades or buckets 38 coupled to shaft 14 to induce rotation of shaft 14 about centerline axis 24. Steam 40 exits casing 16 at steam exhaust conduit 22. Steam 40 may then be channeled to the boiler (not shown) where it may be reheated or channeled to other components of the system, e.g., a low pressure turbine section or a condenser (not shown).

Figure 2:
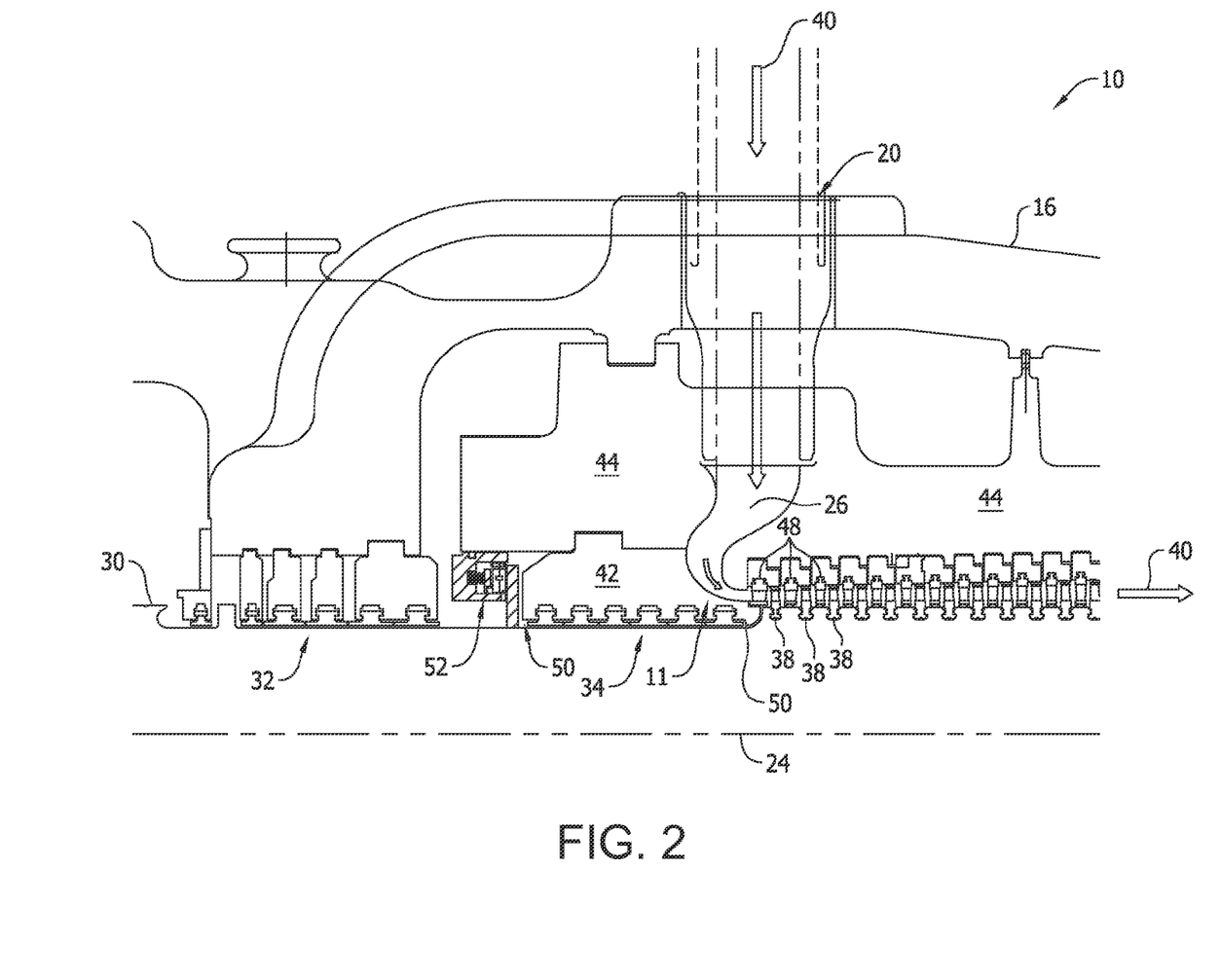
FIG. 2 is a more detailed schematic view of a portion of the steam turbine engine of FIG. 1 taken about an area defined by box 2 in FIG. 1.

FIG. 2 is a more detailed schematic view of a portion of steam turbine engine 10 taken about area 2 defined by box 2 in FIG. 1. In the exemplary embodiment shown in FIG. 2, steam turbine engine 10 includes shaft 14, a stator component 42 coupled to an inner shell 44 of casing 16, and a plurality of sealing members 34 attached to stator component 42. Casing 16, inner shell 44, and stator component 42 each extend circumferentially about shaft 14 and sealing members 34. In the exemplary embodiment, sealing members 34 form a tortuous sealing path between stator component 42 and shaft 14. Shaft 14 includes a plurality of turbine stages 12 through which high-pressure high-temperature steam 40 is passed via one or more inlet bowls 26 at an inlet side 11 of steam turbine engine 10. The turbine stages 12 include a plurality of inlet nozzles 48. Steam turbine engine 10 may include any number of inlet nozzles 48 that enables steam turbine engine 10 to operate as described herein. For example, steam turbine engine 10 may include more or fewer inlet nozzles 48 than shown in FIG. 2. The turbine stages 12 also include a plurality of turbine blades or buckets 38. Steam turbine engine 10 may include any number of buckets 38 that enables steam turbine engine 10 to operate as described herein. For example, steam turbine engine 10 may include more or fewer buckets 38 than are illustrated in FIG. 2. Steam 40 enters inlet bowl 26 through steam inlet conduit 20 and passes down the length of shaft 14 through turbine stages 12.

A portion of the admitted high-pressure high-temperature steam 40 passes through the end packing sealing members 34 via a leakage region 50. The loss of steam 40 through leakage region 50 results in a loss of efficiency of steam turbine engine 10. As described above, to reduce the leakage of steam 40 through the end packing region 32, in the exemplary embodiment, steam turbine engine 10 includes a unique hydrodynamic face seal assembly, generally indicated at 52.

Figure 3:
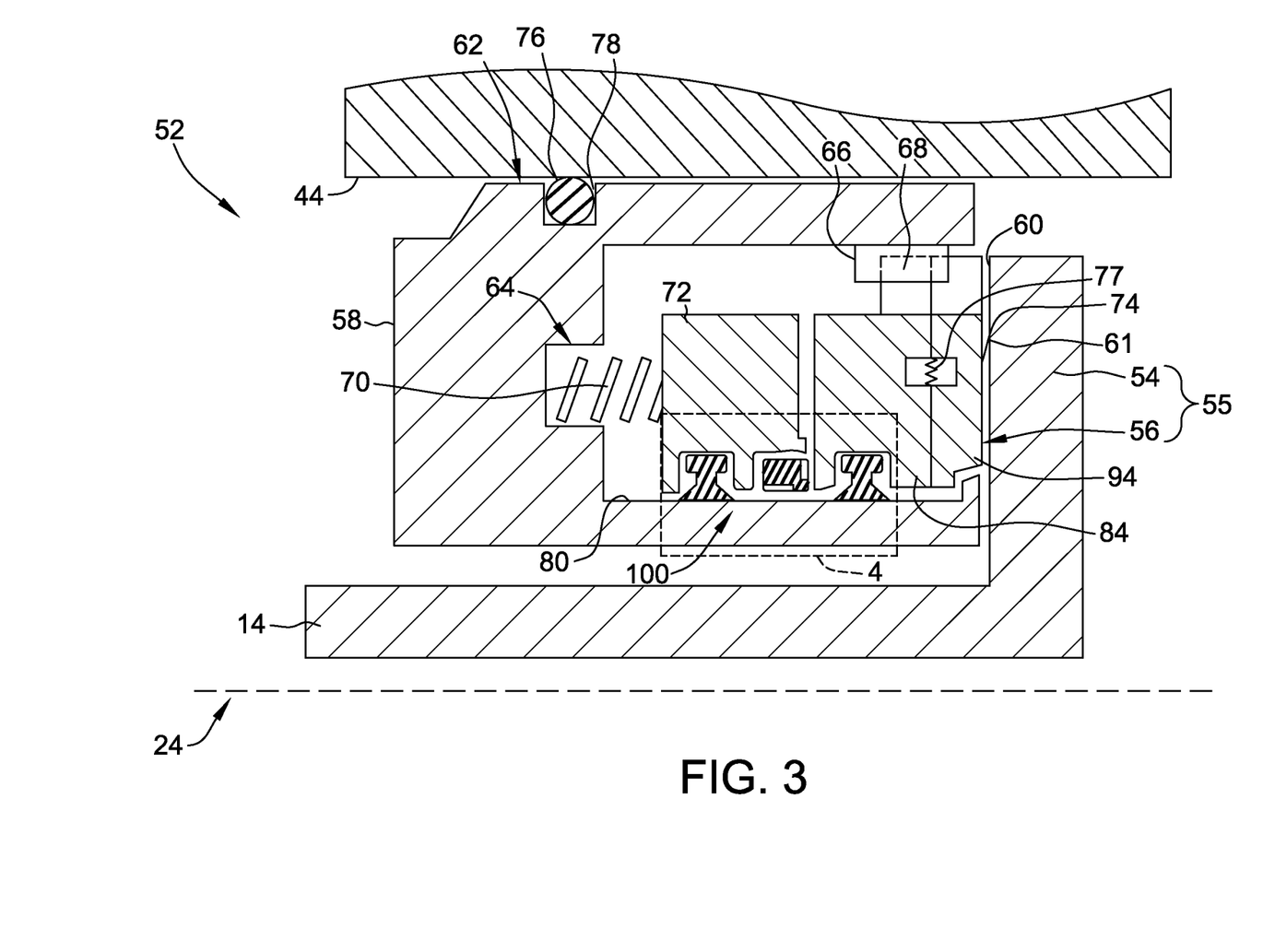
FIG. 3 is a schematic section view of a hydrodynamic face seal used with the steam turbine engine shown in FIG. 1.

FIG. 3 is a schematic section view of a hydrodynamic face seal 52 that may be used with steam turbine engine 10 (shown in FIG. 1.) In the exemplary embodiment, face seal 52 facilitates reducing or preventing leakage of a pressurized process fluid, e.g., steam 40, between a region of relatively high pressure and an area of relatively low pressure. Face seal 52 further reduces a build-up of foreign material, such as contaminants or debris, located in steam 40 that may be deposited on a surface of face seal 52 that causes face seal 52 to operate less efficiently.

In the exemplary embodiment, face seal 52 is a high pressure seal positioned between shaft 14 and inner shell 44 of casing 16 on an inlet side 11 of turbine stages 12. As described above, although a steam turbine engine 10 is illustrated, face seal 52 may be used in any application where a self-adjusting seal is desirable or required. In the exemplary embodiment, face seal 52 includes a rotating seal ring 54, a stationary seal ring assembly 56, and a seal housing 58 concentric with and extending about centerline axis 24 of shaft 14. Rotating seal ring 54 and stationary seal ring assembly 56 together form a primary seal 55.

In the exemplary embodiment, rotating seal ring 54 is coupled to shaft 14 and is rotatable therewith. Alternatively, rotating seal ring 54 may be formed as an integral part of shaft 14. In the exemplary embodiment, rotating seal ring 54 is generally disk shaped and includes an axially-facing, first primary sealing surface 60 that includes hydrodynamic features such as channels or grooves 61 defined therein. Channels or grooves 61 direct process fluid, e.g., steam 40, between rotating seal ring 54 and stationary seal ring 56, thus forming a process fluid film layer that is generally about 0.002 inches thick or less. Alternatively or additionally, channels or grooves 61 may be formed in a secondary primary sealing surface 74 of stationary seal ring assembly 56.

Stationary seal ring assembly 56 includes a primary ring 94 and a support ring 84 coupled together in a face-to-face relationship by an element 77 that provides anti-rotation, positioning, and attachment functions. Primary ring 94 is generally disk-shaped and has a radially-extending surface that defines second primary sealing surface 74. Second primary sealing surface 74 is positioned against rotating seal ring 54 in a face-to-face mating relationship with first primary sealing surface 60. First and second primary sealing surfaces 60 and 74 form a circuitous or tortuous flow path for the fluid, e.g., steam 40.

In the exemplary embodiment, seal housing 58 is configured to couple stationary seal ring assembly 56 to inner shell 44 of casing 16. Seal housing 58 is a non-rotating, axially-extending component that includes a secondary seal assembly 100, described below, that enables seal assembly 56 to slide axially to follow rotating seal ring 54 dynamically in axial translation while providing sealing. Seal housing 58 also includes one or more spring seats 64. Seal housing 58 may include a radially-inward extending alignment member 66 that is coupled to an alignment slot 68 of stationary seal ring assembly 56. Stationary seal ring assembly 56 is coupled to seal housing 58 such that stationary seal ring assembly 56 is axially movable along centerline axis 24 and is not laterally or rotatably moveable. Alignment slot 68 is formed on an outer edge of each of primary ring 94 and support ring 84. Alternatively, stationary seal ring assembly 56 may include any number of alignment slots 68 radially spaced apart about its outer edge. The tongue-in-slot coupling operates as an anti-rotation feature to prevent secondary primary sealing ring assembly 56 from rotating with first primary rotating ring 54.

In some embodiments, seal housing 58 may be integrated with inner shell 44 of casing 16. Furthermore, in some alternative embodiments, stationary seal ring assembly 56 may be coupled directly to inner shell 44. In the exemplary embodiment, seal housing 58 is coupled to inner shell 44 with a structural seal 76 extending along an outer diameter 62 of seal housing 58. Seal housing 58 includes a groove 78 that is configured to receive structural seal 76 therein. In the exemplary embodiment, structural seal 76 is an O-ring. Alternatively, structural seal 76 may be any type of seal that enables face seal 52 to operate as described herein, for example, without limitation, a V-type or C-type metal ring.

In the exemplary embodiment, one or more biasing components 70, such as a spring, extend between spring seat 64 and a radially-extending biasing ring 72 of stationary seal ring assembly 56. Biasing component 70 biases stationary seal ring assembly 56 away from rotating ring 54 to enable rotatable shaft 14 to rotate without initial sealing face contact at startup. Alternatively, biasing component 70 may be configured to bias stationary seal ring assembly 56 towards first seal component 54 so rotatable shaft 14 starts to rotate with initial sealing face contact.

Primary ring 94 includes a radially-extending surface that defines an axially-facing, second primary sealing surface 74 that is positioned against first seal component 54 in a face-to-face mating relationship with first primary sealing surface 60. First and second primary sealing surfaces 60 and 74 form a circuitous or tortuous path for flow of process fluid, e.g., steam 40. In the exemplary embodiment, primary ring 94 and support ring 84 are each segmented into at least two pieces to enable installation. The segment joints of support ring 84 are offset from the segment joints of primary ring 94. This two-layer stationary seal ring assembly 56 allows primary ring 94 segment joints to rest on a continuous surface of support ring 84, thus avoiding potential steps over segment joints. Both support ring 84 and primary ring 94 may be double lapped to achieve a predetermined flatness requirement (typically less than 0.001 inches) on both side surfaces. In the exemplary embodiment, support ring 84 and biasing ring 72 are separate pieces for ease of manufacture. Alternatively, they may be fabricated as an integral part that is segmented.

Figure 4:
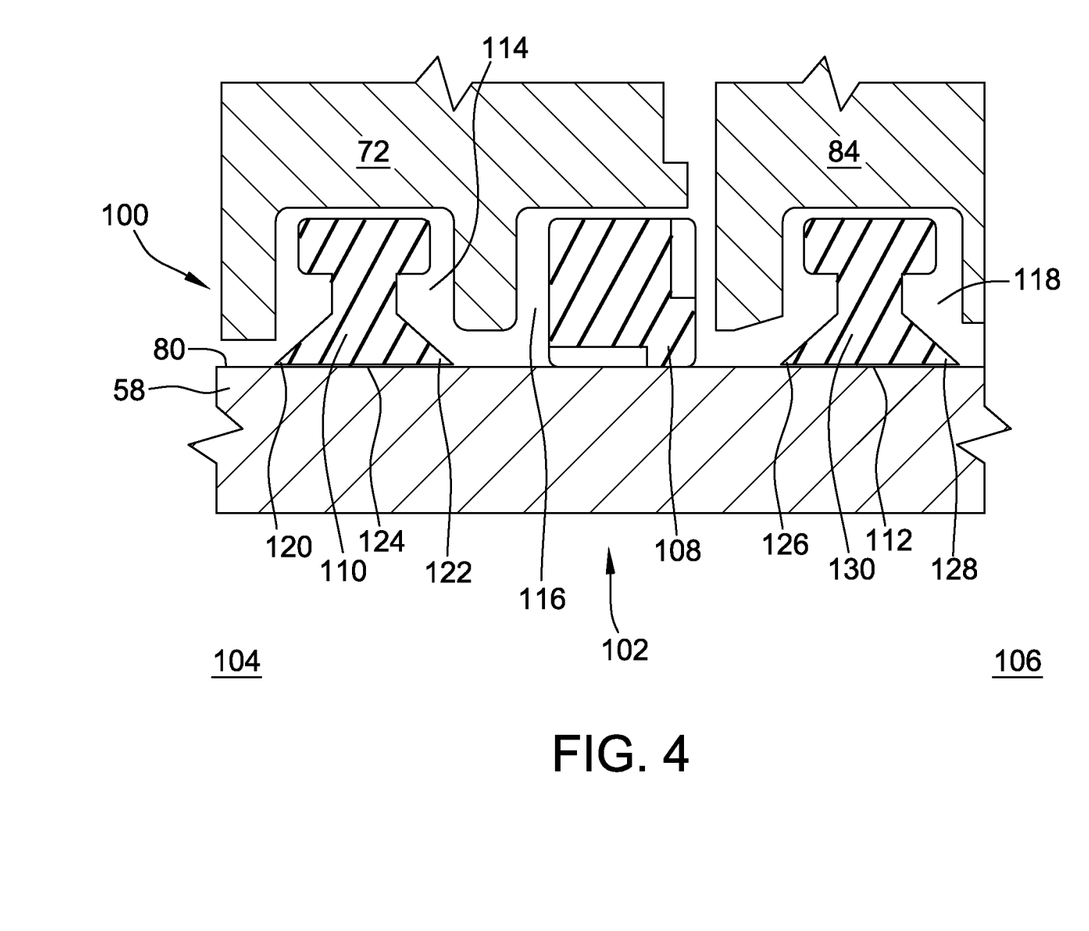
FIG. 4 is a schematic section view of a portion of a secondary sealing assembly used with the hydrodynamic face seal of FIG. 3 taken about an area defined by box 4 in FIG. 3.

In the exemplary embodiment, face seal 52 further includes secondary seal assembly 100 positioned between stationary seal assembly 56 and seal housing 58. Secondary seal assembly 100 is configured to be axially biased with stationary seal ring assembly 56 by biasing component 70. In the exemplary embodiment, secondary seal assembly 100 includes a plurality of rings 102 that, in combination, remove debris from secondary sealing surface 80 and provide a seal for leakage fluid between an upstream side 104 and a downstream side 106 of secondary seal assembly 100. In the exemplary embodiment, secondary seal assembly 100 includes a secondary seal ring 108 that forms a seal between seal housing 56 and stationary seal ring assembly 56 that takes up the pressure loading due to the leakage of steam 40 and at least one protection ring 110. Secondary seal ring 108 provides a seal between upstream side 104 and downstream side 106 of secondary seal assembly 100. In the exemplary embodiment, secondary seal ring 108 is an O-ring. Alternatively, secondary seal ring 108 may be any type of seal that enables stationary seal ring assembly 56 to slide axially relative to seal housing 58, such as, for example, a brush seal, piston ring, or Teflon ring. Secondary seal ring 108 provides sealing against secondary sealing surface 80 of seal housing 58 to prevent leakage of steam 40 between upstream side 104 and downstream side 106 of secondary seal assembly 100 and seal housing 58 while allowing secondary seal assembly 100 to move axially with stationary seal ring assembly 56 to follow rotating seal ring 54 movement due to thermal expansion, thrust reverse, or sealing face wobbling due to manufacturing tolerances.

Preferably, secondary seal assembly 100 includes a first protection ring 110 positioned on upstream side 104 of secondary seal ring 108 and a second protection ring 112 positioned on downstream side 106 of secondary seal ring 108. Alternatively, secondary seal assembly 100 may include only first protection ring 110 on upstream side 104 of secondary seal ring 108. In the exemplary embodiment, first protection ring 110 is coupled within a groove 114 on biasing ring 72, and seal ring 108 is coupled within a second groove 116 also on biasing ring 72. Second protection ring 112 is coupled within a groove 118 on support ring 84 of stationary seal assembly 56. Alternatively, rings 108, 110, and 112 may be coupled within grooves of biasing ring 72 and support ring 84 in any configuration, such as all three rings 108, 110, and 112 coupled to biasing ring 72 or to support ring 84.

In the exemplary embodiment, steam 40 (shown in FIG. 1) leakage flows into seal housing 58 through gaps that exist between alignment slot 68 and alignment member 66. Steam 40 then flows toward upstream end 104 and across secondary sealing surface 80 before encountering biasing ring 72 and secondary seal ring 108. Steam 40 contains particulate debris that is deposited on secondary sealing surface 80 proximate secondary seal ring 108 and may accumulate on surface 80 and other components of stationary seal ring assembly 56, such as rings 72, 84, and 94. Accumulation of the particulate debris may prevent axial biasing of stationary seal ring assembly 56, and, more specifically, secondary seal ring 108. Such a seizure may lead to contact between rotor shaft 14 and at least one of secondary seal assembly 100 and stationary seal ring assembly 56 that may result in damage to any of these components. Furthermore, a seizure of secondary seal assembly 100 and stationary seal ring assembly 56 may lead to failure of primary seal 55, which may, in turn, decrease the operating efficiency of steam turbine engine 10 (shown in FIG. 1).

First protection ring 110 is positioned on a high pressure upstream side 104 of secondary seal ring 108 and second protection ring 112 is positioned on a low pressure downstream side of secondary seal ring 108. In the exemplary embodiment, protection rings 110 and 112 are in contact with secondary sealing surface 80 and are configured to remove particulate debris deposited onto surface 80 by steam 40. Because upstream side 104 of secondary seal ring 108 is subjected to a higher pressure steam 40 containing more particulate debris than downstream side 106, first protection ring is required to remove the particulates from the high pressure upstream side 104 of secondary seal ring 108, while optional second protection ring 112 is configured to remove any remaining particulates on low pressure downstream side 106 that either pass through secondary seal ring 108 or through primary seal 55. As biasing ring 72, support ring 84, and primary ring 94 are biased across secondary sealing surface 80, first and second protection rings 110 and 112 are simultaneously biased in an axial direction to facilitate removing debris from the portion of surface 80 over which secondary seal ring 108 travels. Removal of debris from secondary sealing surface 80 facilitates forming a tight seal at secondary seal ring 108 and preventing secondary seal assembly 100 from seizing.

Additionally, first and second protection rings 110 and 112 may be configured to rotate within grooves 114 and 118, respectively, about axis 24. Rings 110 and 112 may rotate when biasing component is not active to provide for debris removal when rings 110 and 112 are not moving axially. Alternatively, rings 110 and 112 may rotate when biasing component 70 is active to provide for additional debris removal when rings 110 and 112 are moving axially.

In the exemplary embodiment, first protection ring 110 includes an upstream edge 120, a downstream edge 122, and a radially inner surface 124 extending therebetween. Similarly, second protection ring 112 includes an upstream edge 126, a downstream edge 128, and a radially inner surface 130 extending therebetween. At least one of upstream edges 120 and 126, downstream edges 122 and 128, and inner surfaces 124 and 130 are in light contact secondary sealing surface 80 during biasing of secondary seal assembly 100 to facilitate removing particulate debris from surface 80. In the exemplary embodiment, edges 120, 122, 126, and 128 include sharpened tip ends (not shown) that facilitate scraping debris from secondary sealing surface 80. Alternatively, edges 120, 122, 126, and 128 may have any shape, such as, but not limited to, a saw tooth shape, that facilitates operation of secondary seal assembly 100 as described herein. Further, edges 120, 122, 126, and 128 and each of inner surfaces 124 and 130 may include a sweeping element (not shown), such as wire bristles, that facilitates removing particulate debris from secondary sealing surface 80 as secondary seal assembly 100 is biased by component 70. First and second protection rings 110 and 112 make only minimal contact with surface 80 such that rings 110 and 112 are operable only to clean surface 80 and do not take up pressure loading, which prevents rings 110 and 120 from seizing.

The assembly and methods as described herein facilitate improving rotary machine performance by providing a self-cleaning secondary sealing assembly that substantially reduces process fluid leakage within a rotary machine. Specifically, the secondary seal assembly includes a secondary seal ring and protection rings positioned on either side that provide removal of a buildup of particulate debris left on a seal casing by a process fluid. As the secondary seal assembly is biased along a surface of the seal housing, the edges of the protection rings sweep the surface to remove debris deposits left thereon, which facilitates prevent seizure of the secondary seal ring assembly. Therefore, in contrast to known hydrodynamic face seals without cleaning protection rings, the assembly and methods described herein facilitate reducing the maintenance period of large diameter face seals and facilitate reducing the process fluid leakage from the rotary machine.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

What is claimed is:

1. A seal assembly for use with a rotary machine that includes an axis of rotation, said seal assembly comprising:
    a seal housing comprising an axially extending secondary sealing surface;
    a stationary seal ring assembly coupled to said seal housing for axial movement relative to said seal housing, said stationary seal ring assembly comprising a radially extending face sealing surface and an opposite second surface;
    a biasing ring adjacent to said second surface, said biasing ring coupled to said seal housing for axial movement relative to said seal housing;
    a seal ring positioned in a first groove defined in at least one of said biasing ring and said stationary seal ring assembly, said seal ring configured to form a secondary seal with said secondary sealing surface; and
    a first protection ring positioned in a second groove defined in said biasing ring, said first protection ring comprising an upstream side, a downstream side, and a radially inner surface extending therebetween, said upstream and downstream sides each comprising a wedge-shaped cross-sectional profile that tapers to a sharp edge, each of said sharp edges is configured to contact said secondary sealing surface, wherein said first protection ring further comprises a cylindrical radially outer surface spaced a predefined distance from a cylindrical radially inner surface of said second groove such that said first protection ring is rotatable about the axis in said second groove, said biasing ring is configured to be biased along the axis of rotation such that said first protection ring travels substantially parallel to the axis of rotation along said secondary sealing surface to facilitate removing debris from at least a portion of said secondary sealing surface.

2. The seal assembly in accordance with claim 1, wherein said seal assembly further comprises a second protection ring positioned in a third groove defined in said stationary seal ring assembly, said second protection ring positioned adjacent said secondary sealing surface to facilitate removing debris from at least a portion of said secondary sealing surface, said seal ring is between said first protection ring and said second protection ring.

3. The seal assembly in accordance with claim 2, wherein said second protection ring is rotatable about the axis in said third groove.

4. The seal assembly in accordance with claim 1, wherein said biasing ring and said stationary seal ring assembly cooperate to define said first groove.

5. The seal assembly in accordance with claim 1 further comprising a biasing component coupled to said biasing ring, said biasing component configured to bias said biasing ring and said stationary seal ring assembly along the axis of rotation such that said first protection ring and said seal ring are moveable therewith.

6. The seal assembly in accordance with claim 1, wherein said stationary seal ring assembly further comprises a support ring coupled to a primary sealing ring in face-to-face relationship, wherein said primary sealing ring comprises said face sealing surface, and said support ring comprises said opposite second surface.

7. The seal assembly in accordance with claim 1, wherein said stationary seal ring assembly further comprises at least one alignment slot defined therethrough, said at least one alignment slot configured to slidably couple with a respective alignment member of said seal housing.

8. The seal assembly in accordance with claim 1, wherein said first protection ring includes a sweeping element, said sweeping element configured to contact said secondary sealing surface to facilitate removing debris.

9. A face seal assembly for use with a rotary machine that includes an axis of rotation, said face seal assembly comprising:
a rotating seal ring comprising a radially extending first face sealing surface;
a seal housing comprising an axially extending secondary sealing surface;
a stationary seal ring assembly coupled to said seal housing for axial movement relative to said seal housing, said stationary seal ring assembly comprising a support ring coupled to a primary sealing ring in face-to-face relationship, said primary sealing ring comprising a radially extending second face sealing surface configured to form a face seal with said first face sealing surface;
a biasing ring adjacent to said support ring, said biasing ring coupled to said seal housing for axial movement relative to said seal housing;
a secondary seal ring positioned in a first groove defined in at least one of said biasing ring and said support ring, said secondary seal ring configured to form a secondary seal with said secondary sealing surface; and
a first protection ring positioned in a second groove defined in said biasing ring, said first protection ring comprising a wedge-shaped upstream side, a wedge-shaped downstream side, and a radially inner surface extending therebetween, said upstream and downstream sides each comprising a sharp edge configured to contact said secondary sealing surface, said first protection ring comprising a cylindrical radially outer surface spaced a predefined distance from a cylindrical radially inner surface of said second groove such that said first protection ring is rotatable about the axis in said second groove, said biasing ring is configured to be biased along the axis of rotation such that said first protection ring travels substantially axially along said secondary sealing surface to facilitate removing debris from at least a portion of said secondary sealing surface.

10. The face seal assembly in accordance with claim 9, wherein said secondary seal assembly further comprises a second protection ring positioned in a third groove defined in said support ring, said second protection ring positioned adjacent to said secondary sealing surface to facilitate removing debris from at least a portion of said secondary sealing surface, said secondary seal ring is between said first protection ring and said second protection ring.

11. The face seal assembly in accordance with claim 9, wherein said biasing ring and said support ring cooperate to define said first groove.

12. The face seal assembly in accordance with claim 9, further comprising a biasing component coupled to said biasing ring, said biasing component configured to bias said biasing ring and said stationary seal ring assembly along the axis of rotation such that said first protection ring and said secondary seal ring are moveable therewith.

13. The face seal assembly in accordance with claim 10, wherein said second protection ring is rotatable about the axis in said third groove.

14. The face seal assembly in accordance with claim 10, wherein said first protection ring includes a sweeping element, said sweeping element configured to contact said seal housing to facilitate removal of debris.

15. A method of assembling a seal assembly for use with a rotary machine having an axis of rotation, said method comprising:
providing a seal housing that includes an axially extending secondary sealing surface;
coupling a stationary seal ring assembly to the seal housing for axial movement relative to the seal housing, the stationary seal ring assembly including a radially extending face sealing surface and an opposite second surface;
coupling a biasing ring to the seal housing for axial movement relative to the seal housing, the biasing ring adjacent to the second surface;
positioning a seal ring in a first groove defined in at least one of the biasing ring and the stationary seal ring assembly, such that the seal ring and the secondary seal surface form a secondary seal; and
positioning a first protection ring in a second groove defined in the biasing ring, the first protection ring including an upstream side, a downstream side, and a radially inner surface extending therebetween, the upstream and downstream sides each having a wedge-shaped cross-sectional profile that tapers to a sharp edge, each sharp edge is configured to contact the secondary sealing surface, the first protection ring further including a cylindrical radially outer surface spaced a predefined distance from a cylindrical radially inner surface of the second groove such that the first protection ring is rotatable about the axis in the second groove, the biasing ring is configured to be biased along the axis of rotation such that the first protection ring travels substantially axially along the secondary sealing surface to facilitate removing debris from at least a portion of the secondary sealing surface.

16. The method in accordance with claim 15, further comprising positioning a second protection ring in a third groove defined in the stationary seal ring assembly, the second protection ring positioned adjacent the secondary sealing surface to facilitate removing debris from at least a portion of the secondary sealing surface, the seal ring is between the first protection ring and the second protection ring.

17. The method in accordance with claim 15, wherein positioning the seal ring in the first groove comprises positioning the seal ring in the first groove cooperatively defined by the biasing ring and the stationary seal ring assembly.

18. The method in accordance with claim 17 further comprising coupling a biasing component to the biasing ring, wherein the biasing component is configured to bias the biasing ring and the stationary seal ring assembly along the axis of rotation such that the first protection ring and the seal ring are moveable therewith.

\* \* \* \* \*